US008839029B2

(12) United States Patent
Yamada et al.

(10) Patent No.: US 8,839,029 B2
(45) Date of Patent: Sep. 16, 2014

(54) MULTI-CORE MICROCONTROLLER HAVING COMPARATOR FOR CHECKING PROCESSING RESULTS

(71) Applicant: Renesas Electronics Corporation, Kanagawa (JP)

(72) Inventors: Hiromichi Yamada, Hitachi (JP); Kotaro Shimamura, Hitachinaka (JP); Kesami Hagiwara, Koganei (JP); Yoshikazu Kiyoshige, Hachioji (JP); Yuichi Ishiguro, Kasugai (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/856,485

(22) Filed: Apr. 4, 2013

(65) Prior Publication Data

US 2013/0232383 A1    Sep. 5, 2013

Related U.S. Application Data

(63) Continuation of application No. 12/610,422, filed on Nov. 2, 2009, now Pat. No. 8,433,955.

(30) Foreign Application Priority Data

Nov. 4, 2008    (JP) ................................ 2008-282813

(51) Int. Cl.
*G06F 11/00* (2006.01)
*G06F 11/16* (2006.01)

(52) U.S. Cl.
CPC ........ *G06F 11/1608* (2013.01); *G06F 11/1641* (2013.01); *G06F 11/1687* (2013.01); *G06F 2201/845* (2013.01); *G06F 2201/83* (2013.01); *G06F 11/004* (2013.01)
USPC .......................................................... 714/11

(58) Field of Classification Search
USPC ...................... 714/48, 11; 712/215, 220, 244
See application file for complete search history.

(56) References Cited

U.S. PATENT DOCUMENTS 4,358,823 A * 11/1982 McDonald et al. ............. 714/11
5,249,188 A *  9/1993 McDonald ...................... 714/53

(Continued)

FOREIGN PATENT DOCUMENTS

JP    05100883    4/1993
JP    06274360    9/1994

(Continued)

OTHER PUBLICATIONS

R. Emmerson et al., "Fault Tolerance Achieved in VLSI", IEEE Micro, Dec. 1984.

*Primary Examiner* — Yair Leibovich
(74) *Attorney, Agent, or Firm* — Brundidge & Stanger, P.C.

(57) ABSTRACT

A microcontroller capable of improving processing performance as a whole by executing different programs by a plurality of CPUs and capable of detecting abnormality for safety-required processing by evaluating results of the same processing executed by the plurality of CPUs. A plurality of processing systems including CPUs and memories are provided, data output from the CPUs in each of the processing systems is separately compressed and stored by compressors for each of the CPUs, respectively. The compressed storage data is mutually compared by a comparator, and abnormality of processing can be detected when the comparison result indicates a mismatch. Even when the timings by which the same processing results are obtained are different when the plurality of CPUs asynchronously execute the same processing, the processing results of both of them can be easily compared with each other since compression is carried out by the compressors. Moreover, since the comparison of the comparator is enabled when comparison enable is given from all the CPUs, the comparison operation result can be obtained based on the timing at which the results of compression by the plurality of compressors are determined.

14 Claims, 12 Drawing Sheets

(56) References Cited

U.S. PATENT DOCUMENTS

| | | | | |
|---|---|---|---|---|
| 5,572,620 | A | * | 11/1996 | Reilly et al. .................... 714/11 |
| 5,680,564 | A | | 10/1997 | Diviver et al. |
| 5,751,955 | A | * | 5/1998 | Sonnier et al. .................. 714/12 |
| 5,790,776 | A | * | 8/1998 | Sonnier et al. .................. 714/10 |
| 5,933,624 | A | | 8/1999 | Balmer |
| 5,991,900 | A | * | 11/1999 | Garnett ........................... 714/56 |
| 7,865,770 | B2 | * | 1/2011 | Quach ............................. 714/11 |
| 2003/0131291 | A1 | * | 7/2003 | Morrison et al. ............... 714/54 |
| 2005/0039074 | A1 | | 2/2005 | Tremblay et al. |
| 2005/0246587 | A1 | * | 11/2005 | Bernick et al. ................. 714/38 |
| 2008/0270746 | A1 | | 10/2008 | Mueller et al. |
| 2009/0172370 | A1 | | 7/2009 | Butler |
| 2009/0183035 | A1 | | 7/2009 | Butler et al. |
| 2010/0131741 | A1 | | 5/2010 | Yamada et al. |

FOREIGN PATENT DOCUMENTS

| | | |
|---|---|---|
| JP | 10261762 | 9/1998 |
| JP | 2008518306 | 5/2008 |

* cited by examiner $$\left\{\begin{array}{l}31\text{-}25: \text{RESERVE} \\ \quad 24: \text{CEA (ENABLE COMPARISON OF COMPRESSOR A)} \\ 23\text{-}17: \text{RESERVE} \\ \quad 16: \text{CEB (ENABLE COMPARISON OF COMPRESSOR B)} \\ 15\text{-}8: \text{RESERVE} \\ \quad 7\text{-}2: \text{RESERVE} \\ \quad\quad 1: \text{IEB (ENABLE INTERRUPT TO CPUB)} \\ \quad\quad 0: \text{IEA (ENABLE INTERRUPT TO CPUA)}\end{array}\right.$$

$$\begin{bmatrix} \text{7-1 : RESERVE} \\ \text{0 : ERR(COMPARISON ERROR)} \end{bmatrix}$$

MULTI-CORE MICROCONTROLLER HAVING COMPARATOR FOR CHECKING PROCESSING RESULTS

CROSS-REFERENCE TO RELATED APPLICATION

The present application is a continuation application of application Ser. No. 12/610,422, filed Nov. 2, 2009; which claims priority from Japanese Patent Application No. JP 2008-282813 filed on Nov. 4, 2008, the content of which is hereby incorporated by reference into this application.

TECHNICAL FIELD OF THE INVENTION

The present invention relates to a micro-controller having a plurality of CPUs (central processing units) and relates to the techniques effective in application to control systems of, for example, automobiles.

BACKGROUND OF THE INVENTION

Microcontrollers are semiconductor integrated circuits incorporated in equipment such as home electric appliances, AV devices, mobile phones, automobiles, and industrial machines and carry out processing in accordance with programs stored in memories, thereby controlling the respective equipment.

In automobiles, failure of a control device may lead to an accident. Therefore, components including microcontrollers are required to have a high reliability and also are designed so that a safety function works when failure occurs so as to detect the failure and prevent a dangerous situation of the automobile. The microcontrollers have to diagnose sensors and actuators and detect failure of the sensors and actuators, in addition, the microcontrollers have to detect failure of the microcontrollers itself.

There are various methods for failure detection of the microcontrollers, and a method that uses dual CPU and causes them to carry out the same processing, and always compares the values of buses is often used. "Fault Tolerance Achieved in VLSI," IEEE MICRO, December 1984 (Non-Patent Document 1) describes a method in which a master CPU and a CPU for comparison carry out the same processing at the same time, and the results thereof are compared by a comparator circuit.

In Japanese Patent Application Laid-Open Publication No. 10-261762 (Patent Document 1), technique of providing two memories and two CPUs, and comparing input/output signals of the CPUs is described. More specifically, in a dual-core microcontroller described in Patent Document 1, a first CPU, which executes commands and carries out processing such as calculations and data transfer, and a first memory, which stores the commands executed by and data-processed by the first CPU, are connected to a first bus; similarly, a second CPU, which executes commands and carries out processing such as calculations and data transfer, and a second memory, which stores the commands executed by and data-processed by the second CPU, are connected to a second bus. The first CPU and the second CPU are operated so as to be completely synchronized with each other and carry out the same processing, a comparator compares the state of the first bus and the second bus, the comparison results thereof can be monitored from outside, and unmatched comparison results generate interrupt signals in the first CPU and the second CPU.

SUMMARY OF THE INVENTION

In the conventional techniques, the first CPU and the second CPU execute the same processing at the completely same timing, and processing performance thereof is the same as the case of using single CPU. In powertrain control of automobile controls such as engine control and transmission control, high processing performance is required since calculation processing using many sensors and control of many actuators is required to be carried out in order to improve fuel efficiency and exhaust emissions. Therefore, the demands for use of a dual-core microcontroller having two CPUs or a multi-core microcontroller having three or more CPUs are increasing not only for simply enhancing reliability of operations, but also for improving processing performance.

However, in order to improve processing performance, a plurality of CPUs have to asynchronously carry out different control operations. When processing that requires reliability is needed during the operations, both of the CPUs cannot execute the same processing at the completely same timing only by simply applying the above-described conventional techniques. It is difficult to cause the plurality of CPUs, which have been asynchronously carrying out data processing originally, to execute the same processing in the same state in complete synchronization. If system reset is carried out every time for complete synchronization, the stability of the system may be deteriorated.

It is a preferred aim of the present invention to provide a microcontroller of a multi-CPU mode capable of improving the processing performance as a whole by executing different programs by a plurality of CPUs, respectively, and capable of detecting abnormality in the processing that requires safety by evaluating the results of the same processing executed by the plurality of CPUs.

The above and other preferred aims and novel characteristics of the present invention will be apparent from the description of the present specification and the accompanying drawings.

The typical ones of the inventions disclosed in the present application will be briefly described as follows.

More specifically, a plurality of processing systems including CPUs and memories are provided, data output from the CPUs respectively for the processing systems is separately compressed and stored by compressors respectively for the CPUs. The compressed storage data pieces are mutually compared by a comparator, and abnormality of processing can be detected when the comparison result indicates a mismatch. The comparison operation by the comparator is enabled when comparison enable is given from the CPUs. Even when the timings by which the same processing results are obtained are different among the plurality of CPUs asynchronously execute the same processing, the processing results of both of the results can be easily compared with each other by carrying out compression by the compressors. When the plurality of CPUs execute the same processing asynchronously, the comparison of the comparator is enabled when comparison enable is given from all the CPUs; thus, the timing at which the compression results by the plurality of compressors are matched can be clarified, and it is ensured that normal comparison operation results can be obtained. Therefore, high-performance processing can be carried out by executing different applications by the plurality of CPUs; at the same time, the results output at different timings when the safety-required same application is asynchronously executed by the plurality of CPUs can be checked, and safety of the processing of particular applications can be enhanced.

The effects obtained by typical aspects of the present invention will be briefly described below.

The processing performance as a whole can be improved by executing different programs by a plurality of CPUs, respectively, and abnormality can be detected in the processing that requires safety by evaluating the results of the same processing executed by the plurality of CPUs.

BRIEF DESCRIPTIONS OF THE DRAWINGS

DESCRIPTIONS OF THE PREFERRED EMBODIMENTS

1. Overviews of the Embodiments

Figure 1:
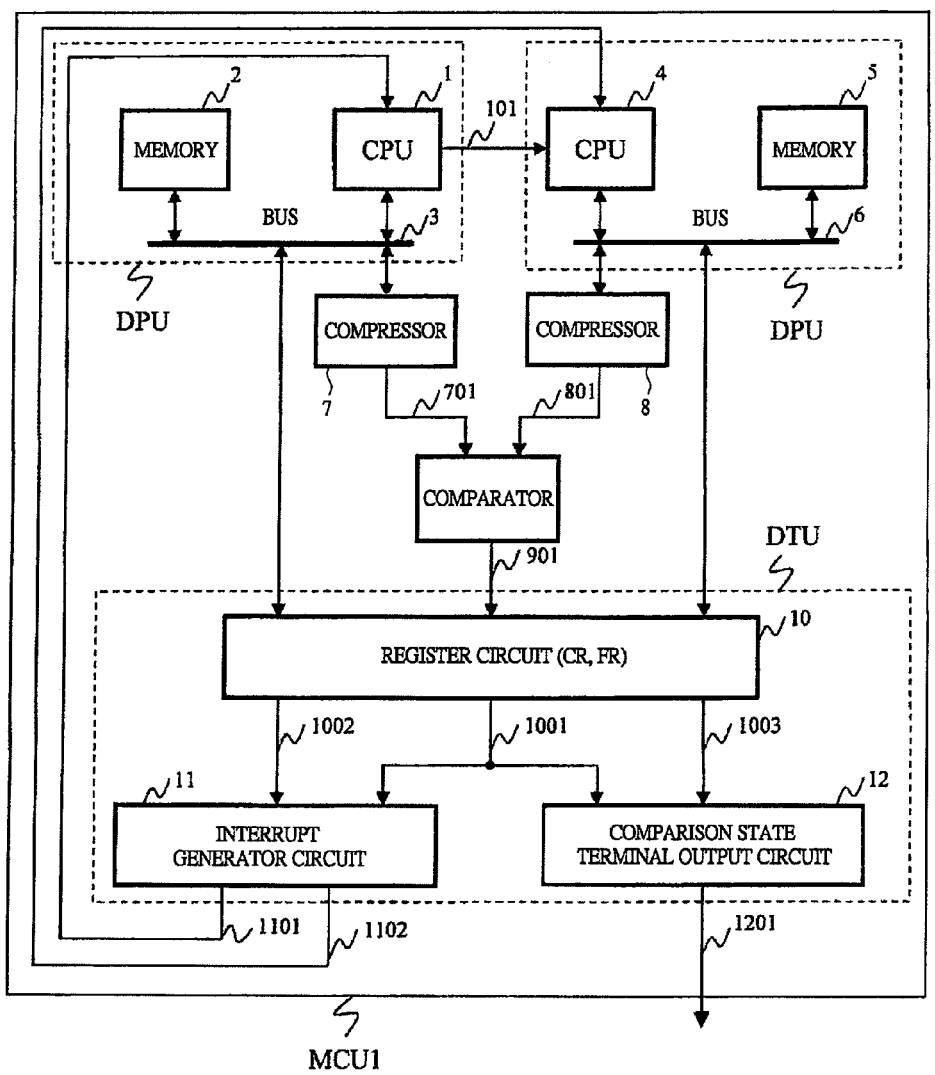
FIG. 1 is a block diagram of a microcontroller according to a first embodiment to which the present invention is applied serving as a dual-core microcontroller having two CPUs.

First, overviews of typical embodiments of the invention disclosed in the present application will be described. In the description of the overviews of the typical embodiments, the reference numerals in the drawings referenced with parentheses are merely denoting the examples which are included in the general ideas of the components, which are denoted by the reference numerals.

[1] A microcontroller (MCU1, MCU2) according to the present invention has: a plurality of data processing units (DPU) respectively executing commands; a plurality of compressors (7, 8, 17) compressing and retaining information, which is generated by the data processing units, respectively for the data processing units; a comparator (9) comparing data pieces retained in the plurality of compressors; and a detection unit (DTU) detecting abnormality of the data processing units when the plurality of data processing units asynchronously carry out the same processing. The detection unit fetches in a comparison result of the comparator on a condition that enable signals are output from the data processing units.

Even when the timings by which the same processing results are obtained are different in the plurality of data processing units asynchronously executing the same processing, the processing results of both of them can be easily compared with each other by carrying out compression by the compressors. When the plurality of data processing units execute the same processing asynchronously, the comparison of the comparator is enabled when comparison enable is given from all the data processing units; thus, the timing at which the compression results by the plurality of compressors are matched can be clarified, and it is ensured that normal comparison operation results can be obtained. Therefore, high-performance processing can be carried out by executing different applications by the plurality of data processing units; at the same time, the results output at different timings when the safety-required same application is asynchronously executed by the plurality of data processing units can be checked, and the safety of the processing of particular applications can be enhanced.

[2] In the microcontroller of the item 1, each of the data processing units has a central processing unit (1, 4, 14) executing commands; wherein, when the central processing unit of one of the data processing units executes the same processing, one of the data processing units gives an instruction to execute the same processing to each of the central processing units of the other data processing units.

[3] In the microcontroller of the item 2, the instruction to execute the same processing is an interrupt request (101) output from the central processing unit of the one of the data processing units to the central processing unit of the other data processing unit.

[4] In the microcontroller of the item 1, the central processing units of the data processing units can execute mutually different processings in parallel; and the same processing is processing for which higher reliability is required than the mutually different processings.

[5] A microcontroller (MCU1, MCU2) according to a different aspect of the present invention has: a plurality of data processing units (DPU), each of which having a central processing unit (1, 4, 14) and a memory (2, 5, 15); a plurality of compressors (7, 8, 17) compressing and retaining information, which is generated by the data processing units, respectively for the data processing units; a comparator (9) comparing the data retained by the plurality of compressors; and a comparison result register (FR) retaining a comparison result of the comparator. When the central processing unit of one of the data processing units executes a first processing, the central processing unit gives an instruction for executing the first processing to each of the central processing units of the other data processing unit. The comparison result register fetches in the comparison result of the comparator on a condition that enable signals are output from the each of the central processing units of the data processing units.

Even when the timings by which the same processing results are obtained are different in the plurality of central processing units asynchronously executing the same processing, the processing results of both of them can be easily compared with each other by carrying out compression by the compressors. When the plurality of central processing units execute the same processing asynchronously, the comparison of the comparator is enabled when comparison enable is given from all the central processing units; thus, the timing at which the compression results by the plurality of compressors are matched can be clarified, and it is ensured that normal comparison operation results can be obtained. Therefore, high-performance processing can be carried out by executing different applications by the plurality of central processing units; at the same time, the results output at different timings when the safety-required same application is asynchronously executed by the plurality of central processing units can be checked, and the safety of the processing of particular applications can be enhanced.

[6] In the microcontroller of the item 5, the central processing units of the data processing units can execute mutually different processings in parallel.

[7] In the microcontroller of the item 5, the instruction to execute the first processing is an interrupt request (101) output from the central processing unit of one of the data processing units to the central processing unit of another data processing unit.

[8] In the microcontroller of the item 5, each of the compressors has a data register (74) disposed in address space of the central processing unit of the corresponding data processing unit, and the central processing unit specifies an address and compresses the data written to the data register.

[9] In the microcontroller of the item 8, each of the compressors further has a compression circuit (72) which receives input of the data written to the data register and the data output from the central processing unit and compresses the data; and has a selector (73) which selects and receives input of the output data of the compression circuit or the output data of the corresponding central processing unit and gives output to the data register, wherein the data register functions as an accumulator.

[10] The microcontroller of the item 5 further has a fetch enable register (CR0 to CR2) in which enable information is set respectively for the enable signals output from the central processing units, wherein, when all of the enable information enables fetching, the comparison result register fetches in the comparison result of the comparator.

[11] In the microcontroller of the item 10, when all of the enable information enables fetching, the fetch enable register is inverted to a fetch disable state after the comparison result is instructed to be fetched to the comparison result register.

[12] The microcontroller of the item 10 further has an interrupt enable register (CR3) in which enable information of generation of interruption is set for each of the central processing units when the comparison result fetched to the comparison result register indicates a mismatch; and one of the central processing units carries out setting of the interrupt enable register.

[13] The microcontroller of the item 5 further has an output circuit (12) which outputs the fact that the comparison result is fetched to the comparison result register and the fetched comparison result to the outside.

[14] In the microcontroller of the item 11, the comparison result register can be cleared from either one of the central processing units.

[15] The microcontroller of the item 6 is mounted in an automobile control device (19), and the first processing in the microcontroller is automobile control processing for which higher reliability is required than the mutually different processings.

[16] A microcontroller according to another aspect of the present invention has: a plurality of data processing units respectively executing commands; a plurality of data buffers retaining information, which is generated by the data processing units, respectively for the data processing units; a comparator comparing data pieces retained in the plurality of data buffers; and a detection unit detecting abnormality of the data processing units when the plurality of data processing units asynchronously carry out same processing. The detection unit fetches in a comparison result of the comparator on a condition that enable signals are output from the respective data processing units.

[17] In the microcontroller of the item 16, each of the data processing units has a central processing unit executing commands. When the central processing unit of one of the data processing units executes the same processing, the one of the data processing units gives an instruction to execute the same processing to each of the central processing unit of the other data processing units.

[18] In the microcontroller of the item 17, the instruction to execute the same processing is an interrupt request to be output from the central processing unit of the one of the data processing units to the central processing unit of the other data processing unit.

[19] In the microcontroller of the item 16, the central processing units of the data processing units can execute mutually different processings in parallel. The same processing is processing for which higher reliability is required than the mutually different processings.

[20] A microcontroller according to another aspect of the present invention has: a plurality of data processing units, each of which having a central processing unit and a memory; a plurality of data buffers retaining information, which is generated by the data processing units, respectively for the data processing units; a comparator mutually comparing the data retained by the plurality of data buffers; and a comparison result register retaining a comparison result of the comparator. When the central processing unit of one of the data processing units executes a first processing, the central processing unit gives an instruction to execute the first processing to each of the central processing units of the other data processing units. The comparison result register fetches in the comparison result of the comparator on a condition that enable signals are output from the each of the central processing units of the data processing units.

[21] In the microcontroller of the item 20, the central processing units of the data processing units can execute mutually different processings in parallel.

[22] In the microcontroller of the item 20, the instruction to execute the first processing is an interrupt request to be output from the central processing unit of one of the data processing units to the central processing unit of the other data processing units.

[23] In the microcontroller of the item 20, each of the data buffers has one or more data registers disposed in address space of the central processing unit of the corresponding data processing unit, and the central processing unit specifies an address and retains the data written to the data register.

[24] In the microcontroller of the item 23, each of the data buffers functions as FIFO which outputs the data, which is written to the data register, in an order the data is written.

[25] The microcontroller of the item 20 further has a fetch enable register in which enable information is set respectively for the enable signals output from the central processing units, wherein, when all of the enable information enables fetching, the comparison result register fetches in the comparison result of the comparator.

[26] In the microcontroller of the item 25, when all of the enable information enables fetching, the fetch enable register is inverted to a fetch disable state after the comparison result is instructed to be taken in to the comparison result register.

[27] The microcontroller of the item 25 further has an interrupt enable register in which enable information of generation of interruption is set for each of the central processing units when the comparison result fetched into the comparison result register indicates a mismatch, wherein the central processing unit carries out setting of the interrupt enable register.

[28] The microcontroller of the item 20 further has an output circuit which outputs the fact that the comparison result is fetched into the comparison result register and the fetched comparison result to the outside.

[29] In the microcontroller of the item 26, the comparison result register can be cleared from either one of the central processing units.

[30] The microcontroller of the item 17 is mounted on the automobile control device (19), and the first processing is an automobile controlling processing for which higher reliability is required than the mutually different processings.

2. Details of Embodiments

The embodiments will be described in further detail.

FIG. 1 exemplarily illustrates a configuration of a microcontroller according to a first embodiment to which the present invention is applied. The microcontroller MCU1 illustrated herein is constituted as a dual-core microcontroller having two CPUs, and the drawing mainly illustrates the configuration in which the same application for which safety is required can be asynchronously executed by the CPUs, and results thereof to be output at different timings can be checked.

The CPU which executes commands and carries out processing such as calculations and data transfer is denoted by 1. A memory which stores the commands executed by and the data processed by the CPU 1 is denoted by 2. A bus by which the CPU 1 accesses devices such as the memory 2 is denoted by 3. The CPU which executes commands and carries out processing such as calculations and data transfer is denoted by 4. A memory which stores the commands executed by and the data processed by the CPU 4 is denoted by 5. A bus by which the CPU 4 accesses devices such as the memory 5 is denoted by 6. The CPU 1 and the CPU 4 are capable of executing different applications, and the CPUs detect failure by executing the processing for which safety is required (hereinafter, described as safety processing) together and checking the outputs thereof. The safety processing can be activated by either the CPU 1 or the CPU 4; however, in the present embodiment, the CPU 1 activates a safety processing and causes the CPU 4 to start a safety processing by an interrupt signal 101. The CPU 1, the memory 2, and the bus 3 constitute one data processing unit DPU, and the CPU 4, the memory 5, and the bus 6 constitute another data processing unit DPU.

A compressor 7 compresses and stores the data output by the CPU 1. As a compression algorithm, a linear feedback shift register (LFSR), cyclic redundancy check (CRC), or the like can be utilized. The CPU 1 outputs the address of the compressor 7 and write data to the bus 3 in accordance with program of the safety processing to be executed. For example, a signal of a checkpoint of a control flow is conceivable as the data written to the compressor 7. Alternatively, the write data may be the data to be output to an actuator. A compressor 8 similarly compresses and stores data output by the CPU 4. Even when the timings to obtain the same processing results are different in the plurality of CPUs 1 and 4 asynchronously executing the same safety processing, the processing results of both of them can be readily compared with each other by a comparator 9 by carrying out compression by the above-described compressors 7 and 8.

The comparator 9 compares an output signal 701 of the compressor 7 with an output signal 801 of the compressor 8 and outputs a result signal 901. The result signal 901 is, for example, "0" if they are matched or "1" if they are unmatched.

A register circuit 10 has a comparison control register CR and a comparison flag register FR. The CPU 1 and the CPU 4 carry out setting of comparison control in the comparison control register CR, and the result signal 901 of the comparator 9 is retained in the comparison flag register FR. When comparison enable is set in the comparison control register CR by all of the CPUs 1 and 4, the result of the comparison operation of the comparator 9 is reflected in the comparison flag register FR.

When the plurality of CPUs 1 and 4 asynchronously execute the same safety processing, the comparison operation result of the comparator 9 is enabled when comparison enable is given from all of the CPUs 1 and 4. In other words, the comparison result is reflected in the comparison flag register FR. As a result, the timing at which the results of the compression carried out by the plurality of compressors 7 and 8 are matched can be clarified, and obtainment of a normal comparison operation result is ensured.

When a comparison flag signal 1001 indicates a mismatch, an interrupt generation circuit 11 generates an interrupt signal 1101 to the CPU 1 and an interrupt signal 1102 to the CPU 4 in accordance with an interrupt enable signal 1002. The CPUs 1 and 4, which have received the interrupt, execute, for example, exception processing for handling failure.

A comparison state terminal output circuit 12 inputs the comparison flag signal 1001 and a comparison flag register write signal 1003, and outputs a comparison state signal 1201 to a terminal. In other words, the comparison state terminal output circuit 12 functions as an output circuit which outputs the fact that the comparison result has been fetched into the comparison flag register FR and the fetched comparison result to the outside. The comparison result can be monitored from the outside.

As described above, according to the microcontroller MCU1, different applications can be executed by the plurality of CPUs so as to carry out high-performance processing; and, at the same time, the results output at different timings when the plurality of CPUs asynchronously execute the same application for which safety is required can be checked, and the safety of processing carried out by particular applications can be enhanced. Although they are not illustrated, required peripheral circuits and input/output circuits may be connected to the buses 3 and 6, in addition.

The comparator 9, the register circuit 10, the interrupt generation circuit 11, and the comparison state terminal output circuit 12 function as a detection unit DTU which compares the data retained by the compressors 7 and 8 when the plurality of CPUs 1 and 4 asynchronously carry out the same processing and detects abnormality of the data processing units.

Figure 2:
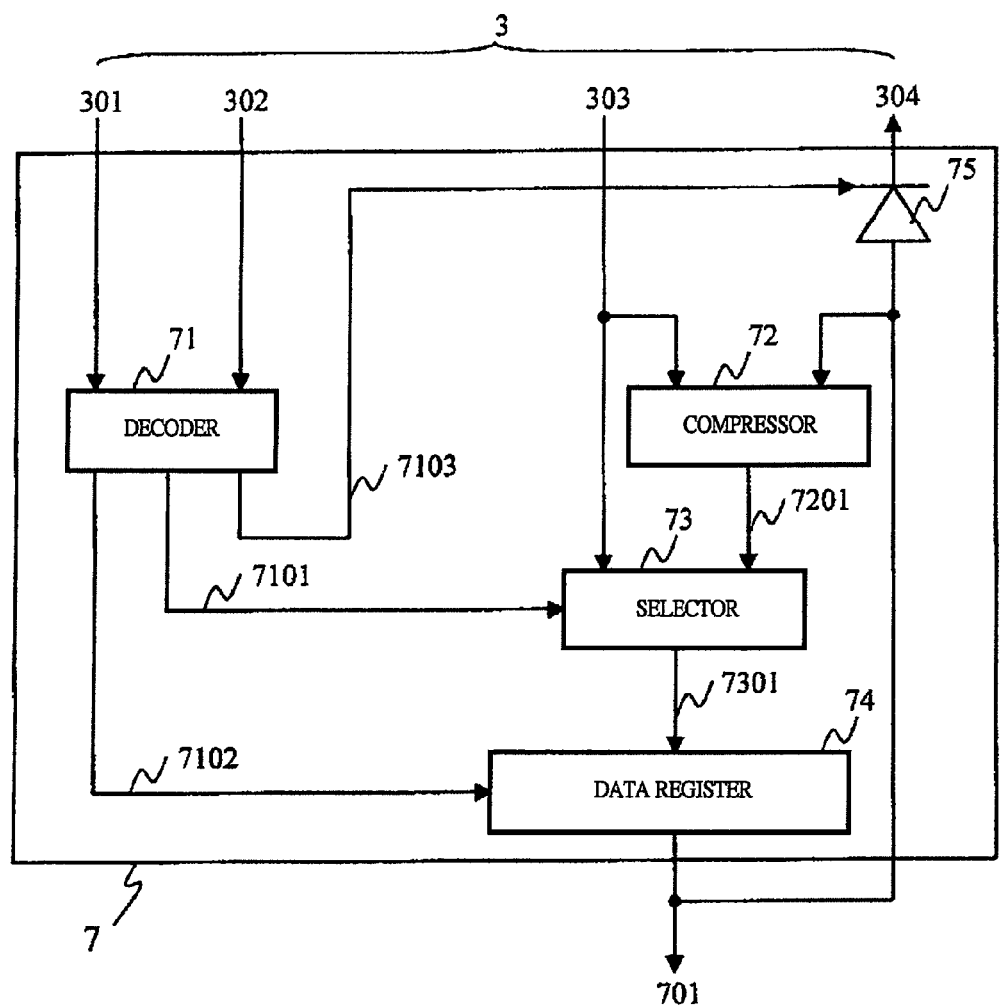
FIG. 2 is a block diagram exemplarily illustrating an internal configuration of a compressor of FIG. 1.

FIG. 2 illustrates an internal configuration of the compressor 7 of FIG. 1. A decoder 71 decodes a command 301 and an address 302 of the bus 3 and, carries out control upon read from or write to the compressor 7. Functions of the compressor 7 are to store write data 303 of the bus 3 into a data register 74 via a selector 73, to subject the write data 303 and compression data 7201, which is from the data register 74, to calculations in a compression circuit 72 and store the data into the data register 74, and to read the data of the data register 74 to the bus 3 via a data driver 75 and output the data as data 304. When the write data 303 is to be stored into the data register 74, the decoder 71 causes a control signal 7101 of the selector 73 to select the bus write data 303 and outputs a data register write signal 7102 so as to write an output signal 7301 of the selector 73 to the data register 74. When the write data 303 and the compression data 7201 from the data register 74 are to be subjected to calculation and stored into the data register 74, the decoder 71 causes the control signal 7101 of the selector 73 to select the output signal 7201 of the compression circuit 72. When the data register 74 is to be read to the bus 3, a drive signal 7103 is output to the read data driver 75 of the bus 3. In the safety processing or the like, the data written to the data register 74 is controlled by the CPU 1 in accordance with an application (program) for the safety processing. Although it is not particularly illustrated, the compressor 8 is also similarly constituted.

Figure 3:
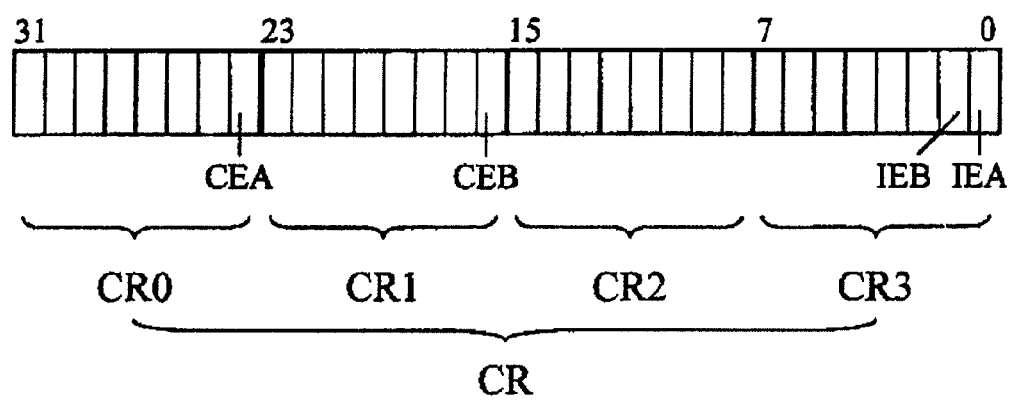
FIG. 3 is an explanatory diagram exemplarily illustrating a configuration of a comparison control register of FIG. 1.

FIG. 3 illustrates the comparison control register CR of the register circuit of FIG. 1. The comparison control register CR can be accessed as a 32-bit register or four 8-bit registers (CR0, CR1, CR2, and CR3). Bits 31 to 25 are reserved bits, and the substance of the register is not required to exist. Upon read, unfixed values or fixed values such as "0" are read. A bit 24 is a comparison enable setting bit (CEA) of the compressor 7. When all of necessary write to the compressor 7 is completed, the CPU 1 causes CEA to be in a comparison enable state "1". Bits 23 to 17 are reserved bits. A bit 16 is a comparison enable setting bit (CEB) of the compressor 8. When all of necessary write to the compressor 8 is completed, the CPU 4 causes CEB to be in a comparison enable state "1". Bits 15 to 2 are reserved bits. A bit 1 is an interrupt enable setting with respect to the CPU 4 when the comparison result indicates a mismatch. A bit 0 is an interrupt enable setting with respect to the CPU 1 when the comparison results indicates a mismatch.

IEA is an interrupt enable bit with respect to the CPU 1, IEB is an interrupt enable bit with respect to the CPU 4, and these bits can be operated by either the CPU 1 or 4.

Figure 4:
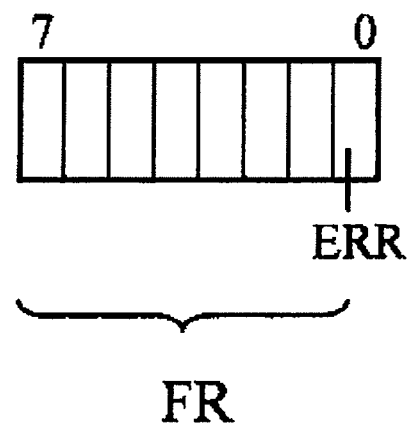
FIG. 4 is an explanatory diagram exemplarily illustrating a configuration of a comparison flag register of FIG. 1.

FIG. 4 illustrates the comparison flag register FR of the register circuit 10 of FIG. 1. The flag register FR is accessed, for example, as an 8-bit register. Bits 7 to 1 are reserved bits, and a bit 0 is a comparison error bit (ERR). When CEA and CEB are set to "1" in FIG. 3, the output signal 901 of the comparator 9 is stored in the ERR bit. When the write to the ERR bit is carried out, CEA and CEB are cleared to "0" by the operation of a logic circuit which the comparison control register CR has. The CPU 1 and the CPU 4 can learn whether the comparison by the comparator 9 has been executed by reading the comparison control register CR and checking CEA and CEB. The comparison flag register FR can be operated by either the CPU 1 or 4.

Figure 5:
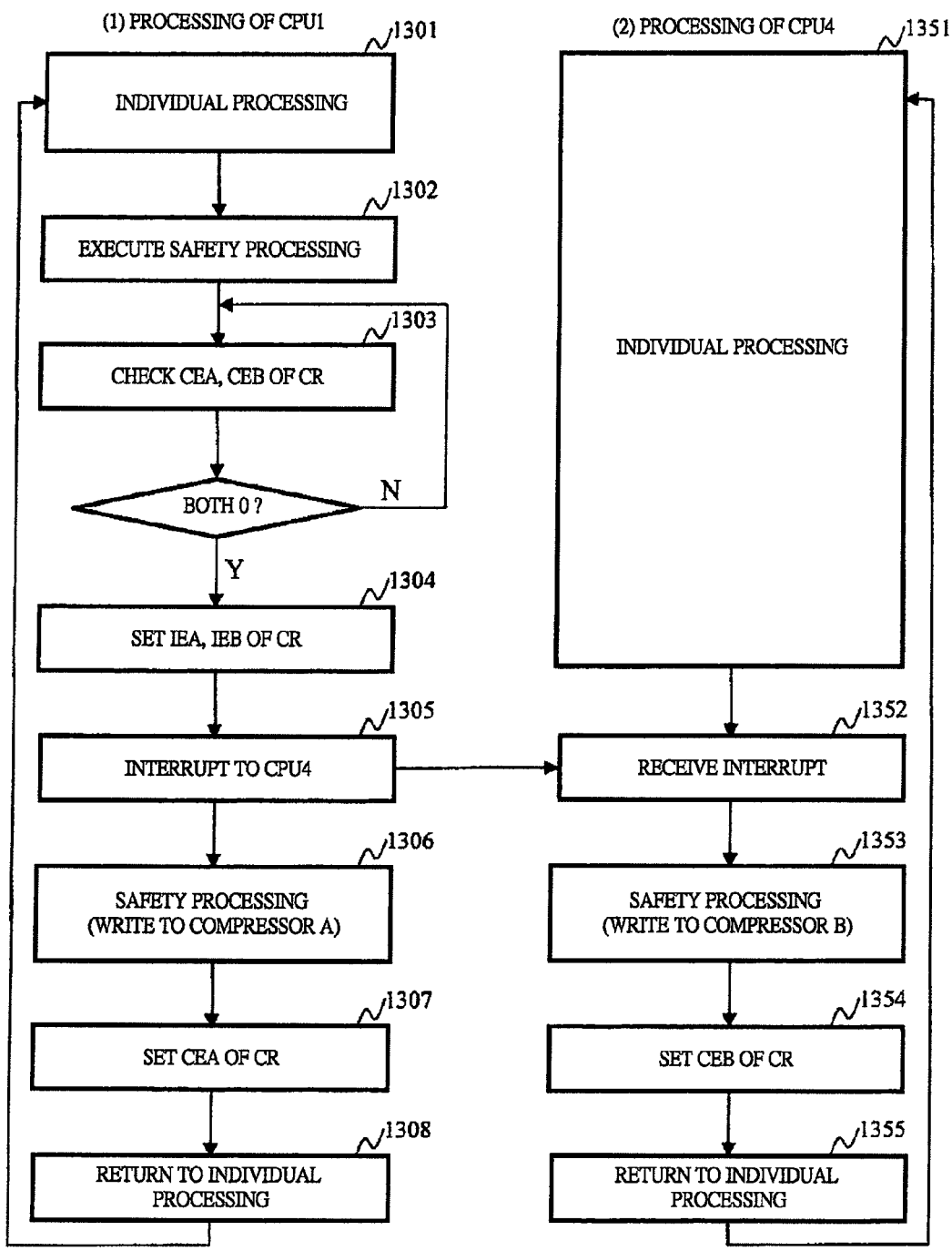
FIG. 5 is a flow chart exemplarily illustrating processing of the two CPUs carried out by the microcontroller of FIG. 1.

FIG. 5 illustrates a process flow of the CPU 1 and the CPU 4. It is assumed that the CPU 1 and the CPU 4 are respectively executing different applications (individual processing 1301, 1351). In the CPU 1, activation processing 1302 for executing a safety processing is started. The CPU 1 checks CEA and CEB of the register CR (1303). If both of them are "0", it means that the comparison of the previous safety processing has been completed; therefore, the CPU proceeds to a next step 1304. If both of them are not "0", the step 1303 is continued. At a step 1304, the IEA bit and the IEB bit of the register CR are set. Subsequently, an interruption 1305 is generated for causing the CPU 4 to execute a safety processing. The CPU 1 starts a safety processing 1306 and writes the data, which is to be checked, to the compressor A7. When the safety processing is finished, CEA of the register CR is set to "1" (1307), and the flow returns to the individual processing (1308). On the other hand, the CPU 4 receives the interruption from the CPU 1 during execution of individual processing 1351 (1352). The CPU 4 starts a safety processing 1353 and writes the data, which is to be checked, to the compressor B8. When the safety processing is finished, CEB of the register CR is set to "1" (1354), and the flow returns to the individual processing (1355).

Figure 6:
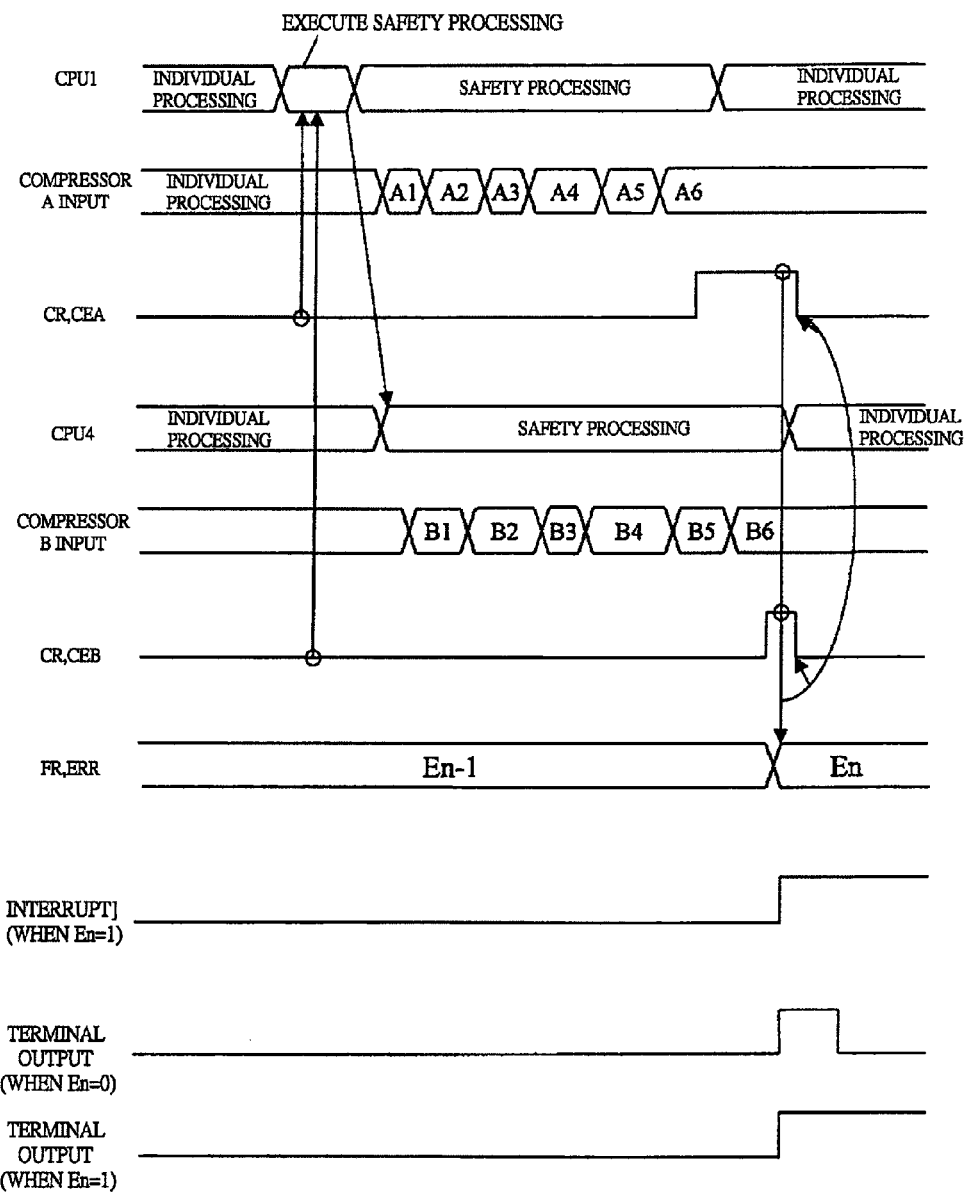
FIG. 6 is a timing chart exemplarily illustrating the processing of the two CPUs carried out by the microcontroller of FIG. 1.

FIG. 6 illustrates a timing chart of the processing of the CPU 1 and the CPU 4. The CPU 1 reads the register CR upon safety processing activation and checks the values of CEA and CEB. When both of them are "0" and it is confirmed that the comparison of the previous safety processing has been completed, the interruption for causing the CPU 4 to carry out the safety processing is carried out, and then the safety processing is started. In the safety processing, the data A1 to A6 to be checked is written to the compressor 7. When write of all the check data is finished, CEA of the register CR is set to "1", and the flow returns to the individual processing. The CPU 4 similarly executes a safety processing and writes the data B1 to B6 to be checked to the compressor 8; and, when all of write is finished, CEB of the register CR is set to "1" and the flow returns to the individual processing. The comparison error ERR of the register FR is changed from a previous comparison result En−1 to a present comparison result En. An example of the case in which an interruption is generated when En is "1" (mismatch) is illustrated. "Terminal output" is an example of the output signal 1201 of the comparison state terminal output circuit 12 of FIG. 1. The comparison flag write signal and the comparison result are output by a 1-bit terminal. When En is "0" (matched), a pulse within a certain period of time (for example, corresponding to one external bus cycle of the microcontroller) is output from the timing at which write to the comparison flag is carried out. When En is "1" (mismatched), a long pulse is output. As a result, the fact that the comparison is executed and the comparison result can be confirmed by one terminal signal.

Figure 7:
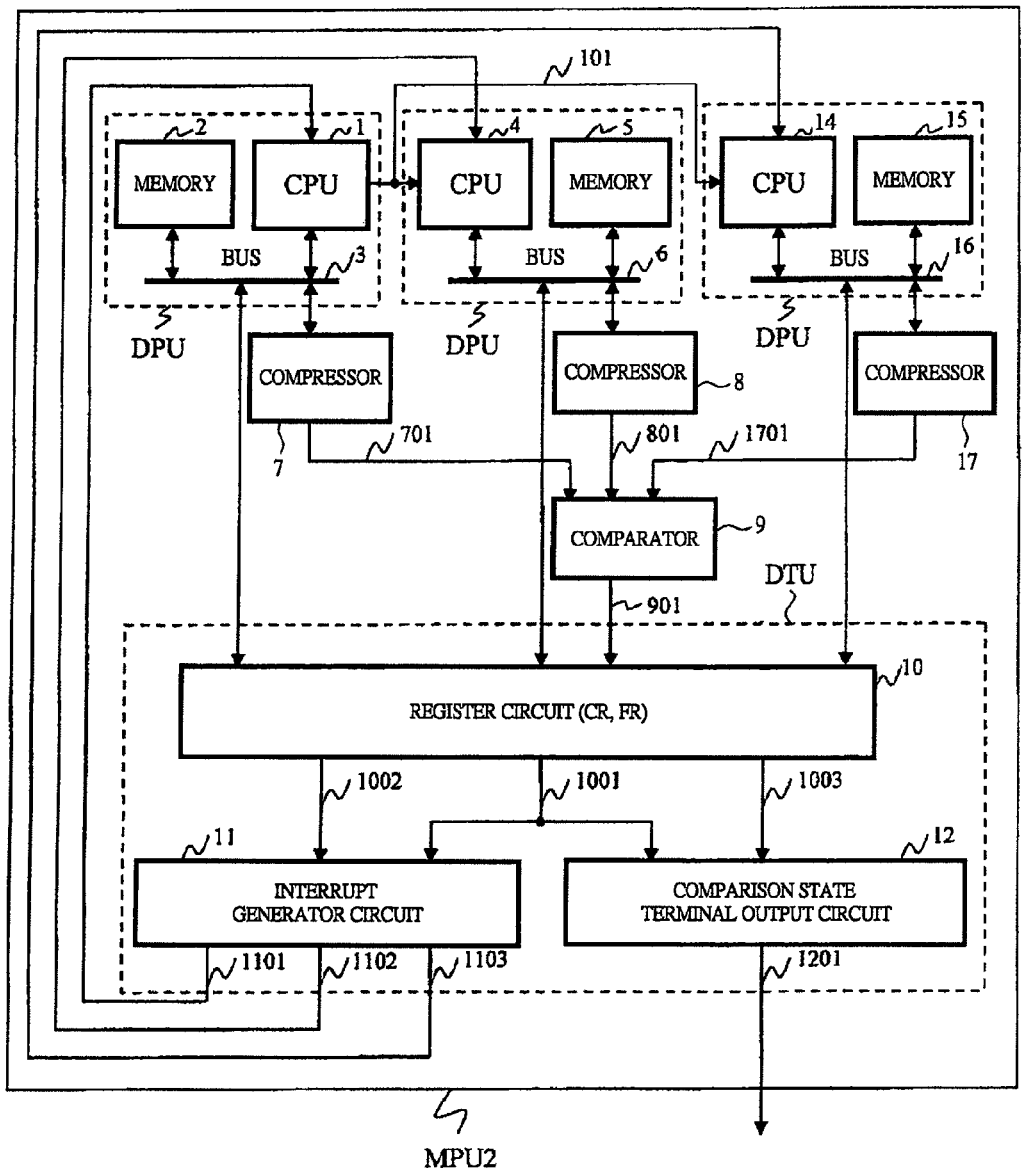
FIG. 7 is a block diagram of a microcontroller according to a second embodiment to which the present invention is applied serving as a multi-core microcontroller having three CPUs.

FIG. 7 exemplarily illustrates a microcontroller MCU2 according to a second embodiment of the present invention. The microcontroller MCU2 is constituted as a multi-core microcontroller having three CPUs. Differences from the dual-core microcontroller of FIG. 1 will be explained. A CPU which executes commands and carries out processing such as calculations and data transfer is denoted by 14. A memory which stores the commands executed by the CPU 14 and the data processed by the CPU 14 is denoted by 15. A bus by which the CPU 14 accesses devices such as the memory 15 is denoted by 16. A compressor which compresses and stores the data output from the CPU 14 is denoted by 17. The comparator which compares the output signal 701 of the compressor 7, the output signal 801 of the compressor 8, and an output signal 1701 of the compressor 17 with one another and outputs a result signal 901 is denoted by 9. In the comparison register CR which the register circuit 10 has, the CPU 1, the CPU 4, and the CPU 14 carry out setting of comparison control, and the comparison flag register FR retains the result signal 901 of the comparator 9. When the comparison flag signal 1001 indicates a mismatch, the interrupt generation circuit 11 generates the interrupt signal 1101 with respect to the CPU 1, the interrupt signal 1102 with respect to the CPU 4, and an interrupt signal 1103 with respect to the CPU 14 in accordance with the interrupt enable signal 1002. The comparison state terminal output circuit 12 inputs the comparison flag signal 1001 and the comparison flag register write signal 1003, and outputs the comparison state signal 1201 from an external terminal.

The microcontroller MCU2 of FIG. 7 has three systems of a processing system having the CPUs and memories in comparison to the microcontroller MCU1 of FIG. 1, and the data output from the CPUs 1, 4, and 14 in the processing systems, respectively, is separately compressed and stored by the compressors 7, 8, and 17 respectively for the CPUs 1, 4, and 14. The compressed storage data is compared in the comparator 9, and abnormality of the processing can be detected by mismatch of the comparison result. The comparison operation carried out by the comparator 9 is enabled when comparison enable is given from the CPUs 1, 4, and 14. When the plurality of CPUs 1, 4, and 14 asynchronously execute the same safety processing by carrying out compression by the compressors 7, 8, and 17, the comparison of the comparator 9 is enabled when comparison enable is given from all of the CPUs 1, 4, and 14; thus, the timing at which the compression results by the plurality of compressors 7, 8, and 17 are matched can be clarified, and obtainment of a normal comparison operation result can be ensured. Therefore, high-performance processing can be carried out by causing the plurality of CPUs 1, 4, and 14 to carry out different applications in parallel, at the same time, the checking of the results output at different timings when the plurality of CPUs 1, 4, and 14 asynchronously execute the same application as a safety processing can be carried out, so that the safety of the processing carried out by particular applications can be enhanced.

Figure 8:
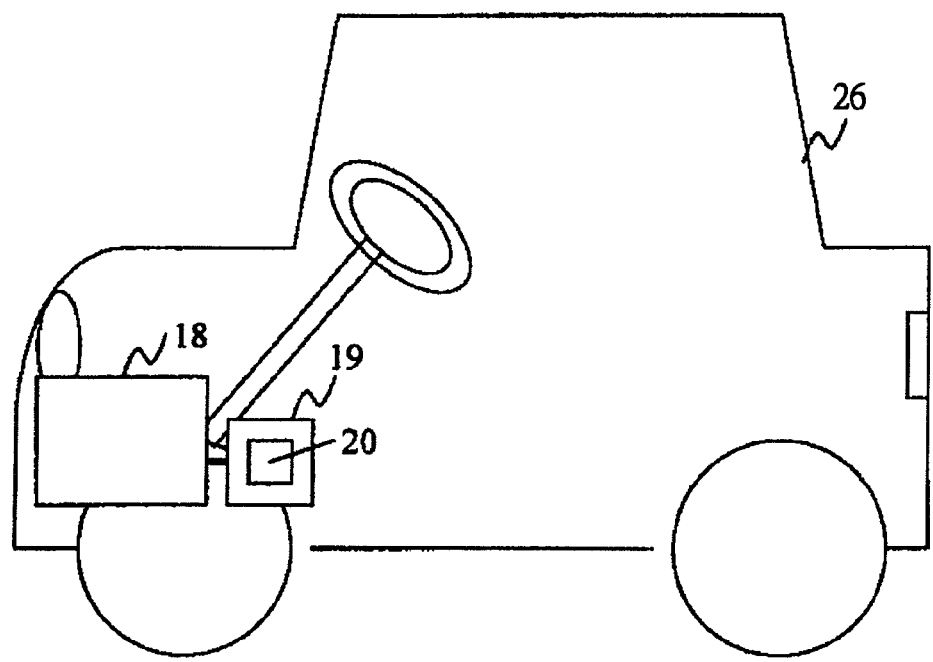
FIG. 8 is a schematic explanatory diagram of an automobile in which an automobile electronic control device having the microcontroller according to the present invention applied therein is mounted.

FIG. 8 illustrates an example in which the microcontroller serving as a multi-core microcontroller according to the present invention is provided to an automobile electronic control device. In an automobile 26, the multi-core microcontroller 20 to which the present invention is applied is mounted in a control device 19 which subjects an engine 18 to electronic control. The multi-core microcontroller 20 is the above described microcontroller MCN1 or MCN2.

Figure 9:
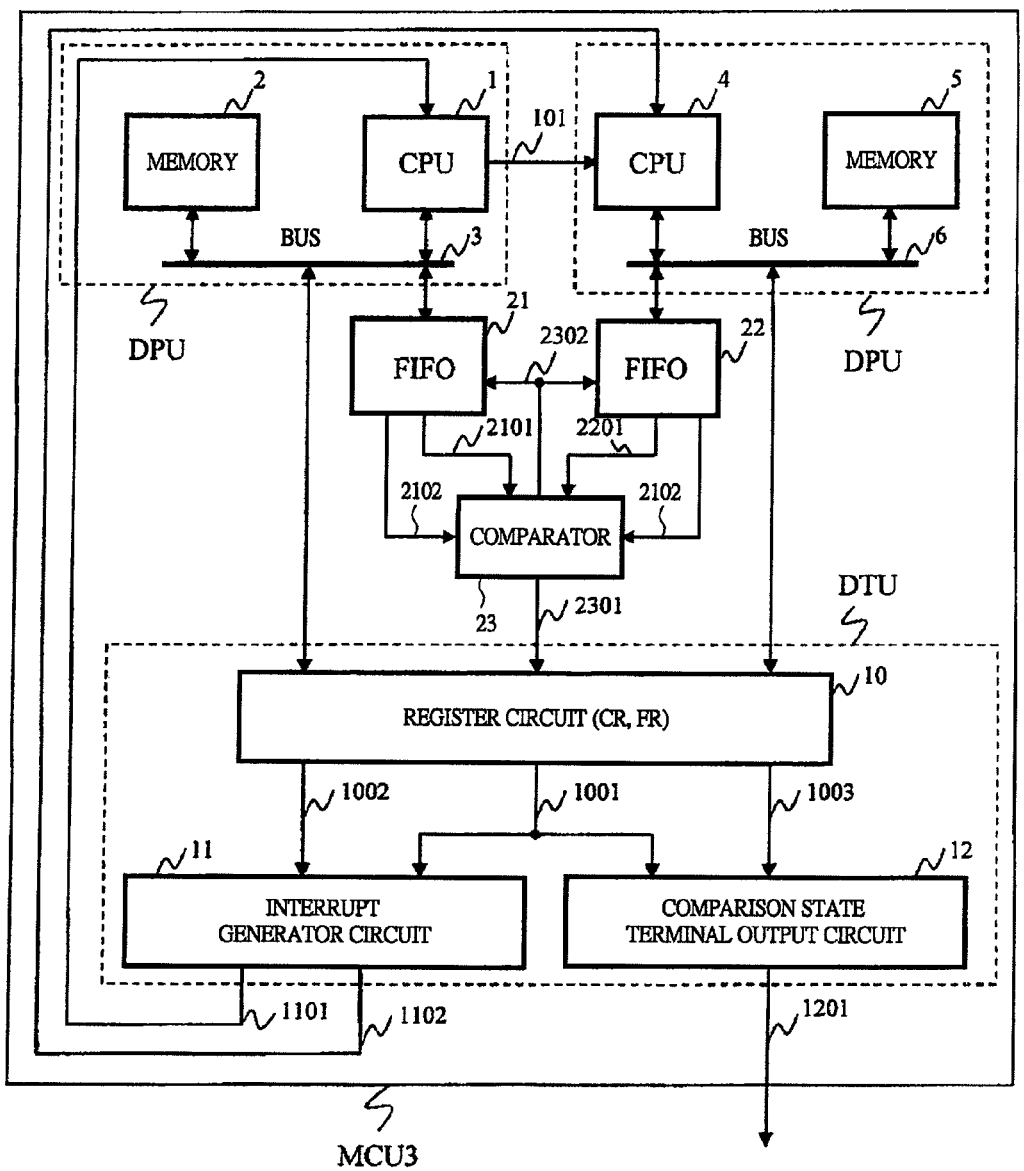
FIG. 9 is a block diagram of a microcontroller according to a third embodiment to which the present invention is applied serving as a dual-core microcontroller having two CPUs.

FIG. 9 exemplarily illustrates a microcontroller MCU3 according to a third embodiment of the present invention. The microcontroller MCU3 is constituted as a dual-core microcontroller having two CPUs. Differences from the dual-core microcontroller MCU1 of FIG. 1 will be explained. The compressor 7, the compressor 8, and the comparator 9 of FIG. 1 are replaced by FIFO 21, FIFO 22, and a comparator 23 in FIG. 9.

The FIFO 21 stores the data output from the CPU 1 into a FIFO register including a plurality of stages of registers of the first-in first-out method without compressing the data. Similarly, the FIFO 22 stores the data output from the CPU 2 into a FIFO register without compressing the data. The FIFO 21 outputs the oldest data of the FIFO register to a FIFO output signal 2101. Also, the FIFO 21 outputs a FIFO output valid signal 2102 which indicates that the FIFO output signal is valid. Similarly, the FIFO 22 outputs a FIFO output signal 2201 and a FIFO output valid signal 2202.

When both of the two FIFO output valid signals 2102 and 2202 indicates validity, the comparator 23 compares the two FIFO output signals 2201 and 2202 with each other and outputs a result signal 2301 to the register circuit 10. When the comparison is carried out, the FIFO output signals thereof become unnecessary. Therefore, a comparison execution signal 2302 is output to the FIFO 21 and the FIFO 22 so as to eliminate the oldest data from the FIFO registers. When all the data stored in the FIFO registers is compared by the comparator 23, the FIFO registers become empty, and the values of the FIFO output valid signals indicate invalidity.

Figure 10:
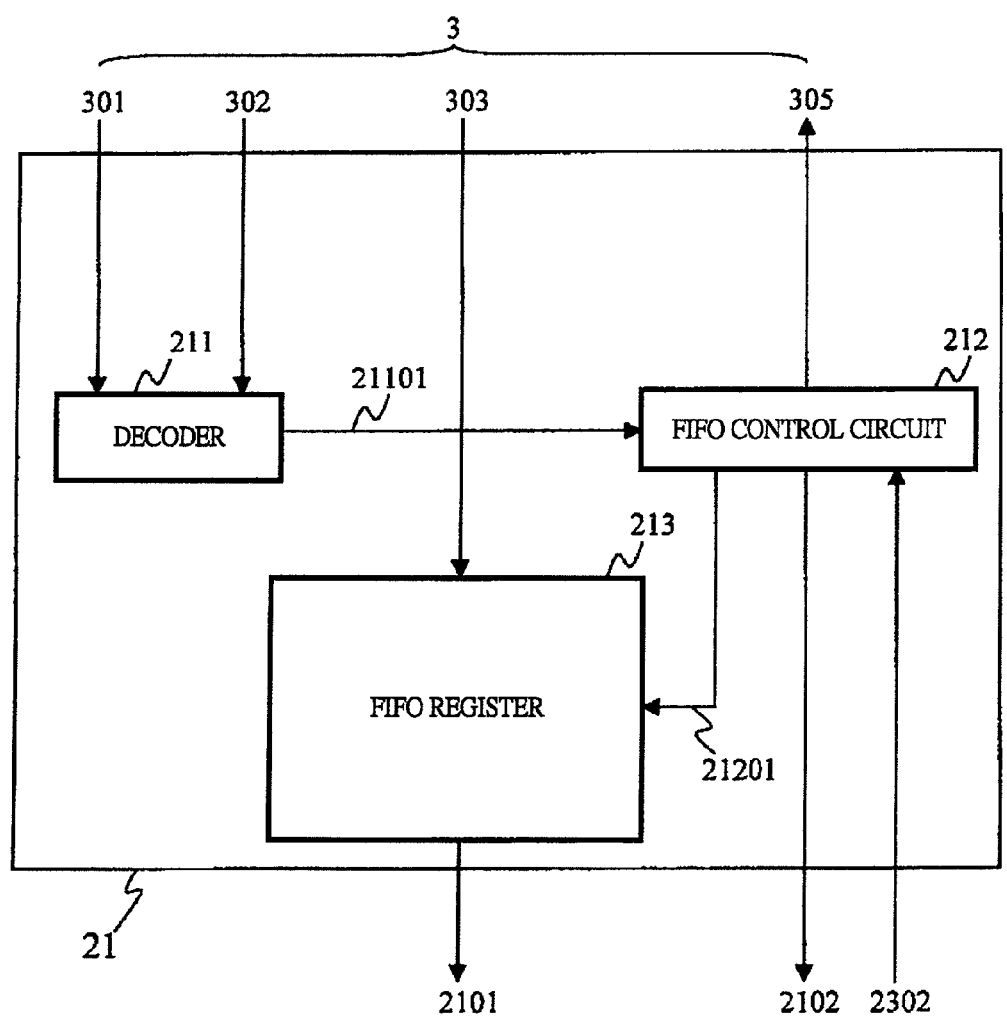
FIG. 10 is a block diagram exemplarily illustrating an internal configuration of FIFO of FIG. 9.

FIG. 10 illustrates an internal configuration of the FIFO 21 of FIG. 9. A decoder 211 decodes a command 301 and an address 302 of the bus 3 and carries out control upon write to this FIFO. Functions of the FIFO 21 is to store write data 303 of the bus 3 into the FIFO register 213, to output the oldest data of the FIFO register 213 as the FIFO output signal 2101, to output the FIFO output valid signal 2102 indicating that data is stored in the FIFO register, to eliminate the oldest data from the FIFO register by the comparison execution signal 2302, and to output a wait request signal 305 for stopping the access of the CPU when the FIFO register has no space.

Figure 11:
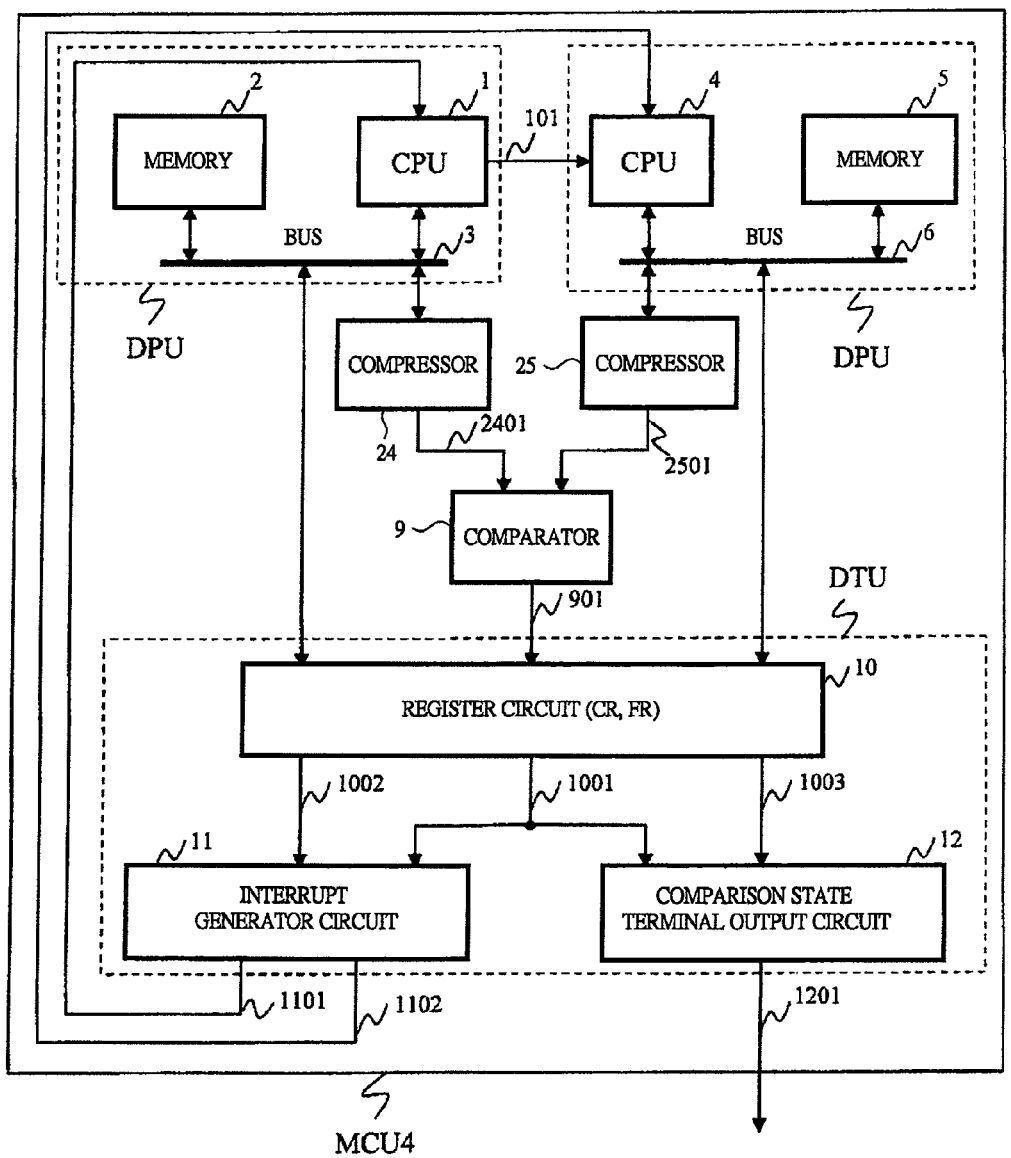
FIG. 11 is a block diagram of a microcontroller according to a fourth embodiment to which the present invention is applied serving as a dual-core microcontroller having two CPUs.

FIG. 11 exemplarily illustrates a microcontroller MCU4 according to a fourth embodiment of the present invention. The microcontroller MCU4 is constituted as a dual-core microcontroller having two CPUs. Differences from the dual-core microcontroller MCU1 of FIG. 1 will be explained. The compressor 7 and the compressor 8 of FIG. 1 are replaced by a compressor 24 and a compressor 25 in FIG. 11.

The compressor 24 has all the functions of the compressor 7 and additionally has functions of monitoring the access from the CPU 1 to the memory 2, and, if it is a write access to a predetermined address range, fetching the data of the write access into the compressor. Similarly, the compressor 25 additionally has functions of monitoring the access from the CPU 4 to the memory 5 and fetching the data of the write access into the compressor.

Figure 12:
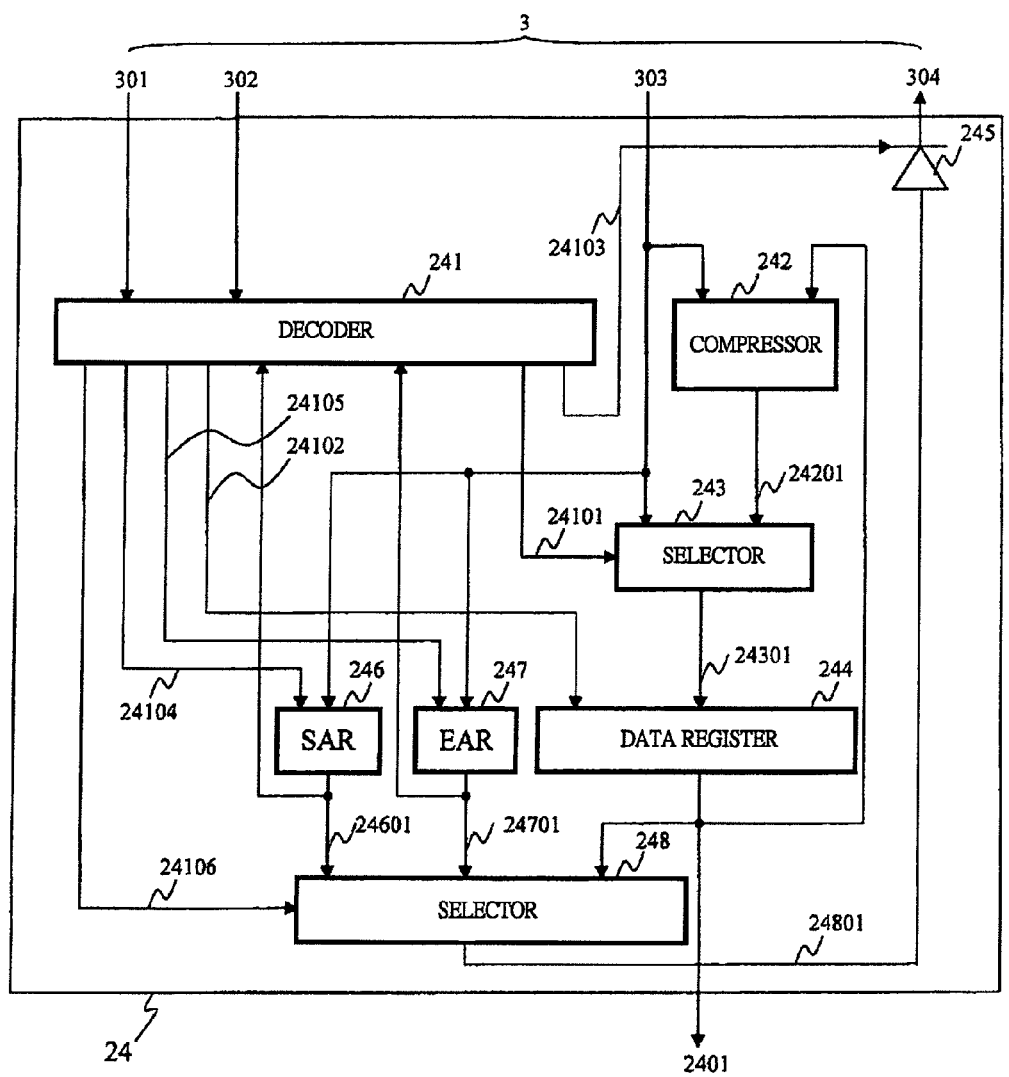
FIG. 12 is a block diagram exemplarily illustrating an internal configuration of a compressor of FIG. 11.

FIG. 12 illustrates an internal configuration of the compressor 24 of FIG. 11. A decoder 241 decodes the command 301 and the address 302 of the bus 3 and carries out control when read from or write to the compressor 24 is performed and when the write access from the CPU 1 to the memory 2 is within the predetermined address range. The functions of the compressor 24 is to store the write data 303 of the bus 3 into a data register 244 via a selector 243, to store the write data 303 of the bus 3 into a start address register SAR 246 or an end address register EAR 247, to subject the write data 303 and compression data 2401, which is from the data register 244, to calculations in the compression circuit 242 and store the data into the data register 244, and to read the data of the data register 244, SAR 246 or EAR 247 to the bus 3 via a data driver 245 and output the data as data 304. When the write data 303 is to be stored into the data register 244, the decoder 241 causes a control signal 24101 of the selector 243 to select the bus write data 303 and outputs a data register write signal 24102 so as to write an output signal 24301 of the selector 243 to the data register 244. When compression data 24201 is to be calculated from the write data 303 and the data register 244 and to be stored into the data register 244, the decoder 241 causes the control signal 24101 of the selector 243 to select the output signal 24201 of the compression circuit 242. When the data of the data register 244, SAR 246, or EAR 247 is to be read to the bus 3, a drive signal 24103 is output to the read data driver 245 of the bus 3. In this process, data is selected in a selector 248 by a data select signal 24106 output from the decoder.

As described above, according to the present invention, high-performance processing can be carried out by using a multi-core microcontroller having a plurality of CPUs and causing the CPUs to execute different applications, and at the same time, failure can be detected by executing the application for which safety is required by the CPUs and checking the results, so that safety can be enhanced.

Hereinabove, the invention made by the present inventors has been described in detail based on the embodiments; however, the present invention is not limited to them, and it goes without saying that various modifications can be made within the range not departing from the gist thereof.

For example, the microcontroller according to the present invention can be widely employed for systems subjected to computer control such as braking systems and other parts in addition to engine electronic control devices, other vehicles in addition to automobiles, industrial devices, and home electric appliances. In addition, the control mode using the comparison enable bits may be a control mode which activates/deactivates the comparison operation itself of the comparator.

What is claimed is:
1. A microcontroller comprising:
a first data processing unit that executes a processing and outputs first write data;
a second data processing unit that executes the processing and outputs second write data;
a first compressor that compress and retains the first write data;

a second compressor that compress and retains the second write data;

a comparator that compares the first retained write data and the second retained write data; and a detection unit, comprising a comparison control register (CR) and a comparison result register (FR), wherein the detection unit detects an abnormality of the first data processing unit and the second data processing unit, wherein the first data processing unit outputs a first enable signal to the CR when the first data processing unit completes the processing, wherein the second data processing unit outputs a second enable signal to the CR when the second data processing unit completes the processing, wherein the detection unit fetches a comparison result of the comparator and stores the comparison result of the comparator to the FR when both the first processing unit and the second processing unit output the first enable signal and the second enable signal, and wherein the first write data and the second write data are data used to check whether or not the first data processing unit and the second data processing unit execute the same processing normally.

2. The microcontroller according to claim 1, wherein each of the first data processing unit and the second data processing unit has a central processing unit executing the processing, and wherein when the central processing unit of the first data processing unit executes the processnq, the central processing unit of the first data processing unit gives an instruction to execute the processing to the central processing unit of the second data processing unit.

3. The microcontroller according to claim 2, wherein the instruction to execute the processing is an interrupt request to be output from the central processing unit of the first data processing unit to the central processing unit of the second data processing unit.

4. The microcontroller according to claim 1, wherein the central processing unit of the first data processing unit and the central processing unit of the second data processing unit can execute mutually different processing operations in parallel, and wherein a reliability of the processing is higher than a reliability of the mutually different processing operations.

5. The microcontroller according to claim 2, wherein each of the first compressor and the second comoressor has a data register disposed in an address space of the central processing unit of the corresponding data processing unit, and wherein the first write data and the second write data are written to the data register having an address specified by the control processing unit.

6. The microcontroller according to claim 2, further comprising:

a fetch enable register in which enable information is set for each of the first enable signal, which is output from the central processing unit of the first data processing unit, and the second enable signal, which is output from the central processing unit of the second data processing unit, wherein the detection unit has a result register that retains a comparison result of the comparator, and wherein when all of the enable information enables fetching, the comparison result register fetches the comparison result of the comparator.

7. The microcontroller according to claim 2, further comprising:

an interrupt enable register in which enable information of generation of interruption is set for each central processing unit when the comparison result fetched into the comparison result register indicates a mismatch, wherein the central processing unit executes setting of the interrupt enable register.

8. A microcontroller comprising:

a first data processing unit that executes a processing and outputs first write data;

a second data processing unit that executes the processing and outputs second write data;

a first data buffer that retains the first write data;

a second data buffer that retains the second write data;

each of the data buffers has one or more data registers disposed in address space of the corresponding data processing unit;

a comparator that compares the first retained write data and the second retained write data; and a detection unit, comprising a comparison control register (CR) and a comparison result register (FR), wherein the detection unit detects abnormality of the first data processing unit and the second data processing unit, wherein the first data processing unit outputs a first enable signal to the CR when the first data processing unit completes the processing, wherein the second data processing unit outputs a second enable signal to the CR when the second data processing unit completes the processing, wherein the detection unit fetches a comparison result of the comparator and stores the comparison result of the comparator to the FR when both the first processing unit and the second processing unit output the first enable signal and the second enable signal, and wherein the first write data and the second write data are data used to check whether or not the first data processing unit and the second data processing unit execute the same processing normally.

9. The microcontroller according to claim 8, wherein each of the first data processing unit and the second data processing unit has a central processing unit executing the processing, and wherein when the central processing unit of the first data processing unit executes the processing, the central processing unit of the first data processing unit gives an instruction to execute the processing to the central processing unit of the second data processing unit.

10. The microcontroller according to claim 9, wherein the instruction to execute the processing is an interrupt request to be output from the central processing unit of the first data processing unit to the central processing unit of one of the second data processing unit.

11. The microcontroller according to claim 9, wherein the central processing unit of the first data processing unit and the central processing unit of the second data processing unit can execute mutually different processing operations in parallel, and wherein a reliability of the processing is higher than a reliability of the mutually different processing operations.

12. The microcontroller according to claim 9, wherein the first write data is written to the data register having an address specified by the central processing unit of the first data processing unit, and the second write data is written to the data register having an address specified by the central processing unit of the second data processing unit.

13. The microcontroller according to claim 8,
wherein when the first data buffer is full, the first data buffer outputs a first wait signal to stop outputting the first write data for the first data processing unit, and
wherein when the second data buffer is full, the second data buffer outputs a second wait signal to stop outputting the second write data for the second data processing unit.

14. The microcontroller according to claim 8,
wherein each of the first data buffer and the second data buffer is a FIFO (first-in first-out) buffer, and
wherein the first write data and the second write data in the FIFO buffer used for comparison are deleted.

* * * * *